(12) United States Patent
Short

(10) Patent No.: US 6,462,839 B1
(45) Date of Patent: Oct. 8, 2002

(54) COMBINED PRINTER/COPIER DEVICE HAVING A PIVOTABLE SCANNER

(75) Inventor: David Bradley Short, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/276,249

(22) Filed: Mar. 25, 1999

(51) Int. Cl.[7] .................................................. H04N 1/04
(52) U.S. Cl. ........................ 358/474; 358/401; 358/497
(58) Field of Search ................................. 358/498, 496, 358/497, 474, 401, 471, 400, 1.14, 296; 399/405

(56) References Cited

U.S. PATENT DOCUMENTS

| | | | |
|---|---|---|---|
| 4,989,099 A | * 1/1991 | Koshiyouji et al. | 358/474 |
| 5,157,416 A | * 10/1992 | Kinoshita et al. | 347/263 |
| 5,790,279 A | 8/1998 | Sakellaropoulos | 358/498 |
| D398,632 S | 9/1998 | Dodge | D18/36 |
| 5,833,381 A | 11/1998 | Kellogg | 400/624 |
| 6,057,936 A | * 5/2000 | Obara et al. | 358/296 |
| 6,160,642 A | * 12/2000 | Mui et al. | 358/498 |
| 6,281,980 B1 | * 8/2001 | Maemura et al. | 358/1.14 |

* cited by examiner

Primary Examiner—Cheukfan Lee

(57) ABSTRACT

An apparatus for producing hardcopy documents includes a printer, a scanner pivotably connected to the printer, and a door, movable between an open position and a closed position, and associated with the printer and scanner such that the scanner will pivot relative to the printer in response to movement of the door.

19 Claims, 7 Drawing Sheets

COMBINED PRINTER/COPIER DEVICE HAVING A PIVOTABLE SCANNER

BACKGROUND OF THE INVENTIONS

1. Field of Inventions

The present inventions relate generally to apparatus for producing hardcopy documents and, more particularly, to combined printer/copier devices such as, for example, those commonly used in conjunction with computers.

2. Description of the Related Art

A wide variety of devices are available for producing hardcopy documents. Such devices includes printers, copiers and combination printer/copiers that are equipped with both a printer for printing documents and a scanner for receiving image information.

In recent years, a number of combined printer/copier devices have been introduced. These devices, which may be connected to a computer, commonly include an ink jet based printing system that has a removable printer cartridge. Others have laser printing based systems. An optical scanning system is also provided. A user can scan a document with the scanning system and then print the document with the printing system. Image information can also be transmitted to and received from the computer. In some instances, a modem is provided to allow scanned text and other images to be transmitted via facsimile over telephone lines to a remote location. One example of a combined printer/copier is the OfficeJet™ Pro Series desktop color printer/scanner/copier manufactured by Hewlett-Packard Company, the assignee of the present application.

Many combined printer/copiers include flatbed optical scanning systems. Flatbed scanning systems typically have a relatively large housing with a glass window that is at least large enough to allow the placement of an 8.5 inch by 11 inch sheet thereon. The image scanning hardware and processing circuitry are located within housing. After a sheet or other image bearing substrate is placed on the glass, the image is irradiated by a light source. The reflected light sensed by an image sensor that moves past the glass window and the signals generated by the sensor are processed and digitized.

In some instances, the printing system and scanning system are located in separate housings and the rearward end of the scanner housing is pivotably connected to the rearward end of the printer housing in a "clam shell" arrangement. The printing system and scanning systems can, alternatively, both be located in a common housing with the scanning system mounted above the printing system. In either case, access to the interior of the housing that encloses the printing system must be provided so that users can replace printer cartridges and clear paper jams.

The inventor herein has determined that the various manners in which conventional combined printer/copiers provide such access are susceptible to improvement. For example, in conventional clam shell type combined printer/copiers, access is provided through the top of the printer housing. The scanner must be unlatched and rotated upwardly to allow access to the interior of the printer. Such combined printer/copiers require relatively strong springs to counter balance the weight of the scanner and hold it in the upward open position, as well as costly and complicated latch systems to oppose the spring force and hold the scanner in the downward closed position.

Conventional combined printer/copiers with a common housing for the printing and scanning systems typically include a door that provides access to the printer cartridge. The door is located to the side of the printing and scanning systems. This arrangement often allows contaminating particles, such as ink aerosol, to enter the scanning system portion of the housing. In addition, use of a common housing makes assembly, disassembly and repair difficult.

The inventor herein has also determined that another shortcoming associated with conventional combined printer/copiers is that when one component (such as the scanning system) is in need of repair, the entire combined printer/copier must be returned to the manufacturer or service center. Additionally, should one component require replacement, the entire conventional combined printer/copier will often have to be replaced because of the difficulty associated with separating the printing system from the scanning system.

SUMMARY OF THE INVENTION

Accordingly, one object of the present invention is to provide an apparatus for producing hardcopy documents that avoids, for practical purposes, the aforementioned problems in the art. In particular, one object of the present invention is to provide an apparatus for producing hardcopy documents that allows convenient access to the printer system. Another object of the present invention is to provide an apparatus for producing hardcopy documents that includes a pivotable scanner, but does not require relatively strong counter forces to hold the scanner up. Still another object of the present invention is to provide an apparatus for producing hardcopy documents that is easier to repair than conventional apparatus.

In order to accomplish some of these and other objectives, an apparatus for producing hardcopy documents in accordance with one embodiment of a present invention includes a printer, a scanner pivotably connected to the printer, and a door, movable between an open position and a closed position, and associated with the printer and scanner such that the scanner will pivot relative to the printer in response to movement of the door. Such an apparatus provides a number of advantages over conventional combined printer/copiers. For example, opening the door will provide access to the interior of the printer housing, to change printer cartridges and clear paper jams, without the risk of contaminating the scanner. The door and its mechanical linkage to the printer and scanner will also hold the scanner in its upwardly pivoted position, thereby eliminating the need for relatively strong springs to hold the scanner up. The present configuration also provides a reduction in housing width, as compared to convention apparatus that have the printing and scanning systems in a single housing, because the access door, which must be located to the side of the printing and scanning systems in conventional apparatus, is unnecessary.

In order to accomplish some of these and other objectives, an apparatus for producing hardcopy documents in accordance with one embodiment of a present invention includes a printer and a scanner. A portion of the scanner located in spaced relation to the rearward end of the scanner is pivotably connected to the printer substantially adjacent the rearward end of the printer. Such an apparatus provides a number of advantages over conventional combined printer/copiers. For example, because the pivot point on the scanner is moved forward, as compared to conventional combined printer/copiers with a clam shell arrangement, the amount of counter force required to lift the scanner up and hold it in place is reduced. The reduction in counter force in turn reduces the amount of stress on the components of the apparatus, many of which are plastic. The amount of counter force can be further reduced by moving portions of the scanning system rearward within the scanner housing.

In order to accomplish some of these and other objectives, a modular apparatus for producing hardcopy documents in accordance with one embodiment of a present invention includes a printer, a scanner and a locking device for releasably coupling the scanner to the printer. Such an apparatus provides a number of advantages over conventional combined printer/copiers. For example, the present apparatus facilitates repairs and the replacement of entire components because the printer can easily be separated from the scanner.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known mode of carrying out the inventions. This description is not to be taken in a limiting sense, but is made merely for the purpose of illustrating the general principles of the inventions. Additionally, it is noted that detailed discussions of various internal operating components of printers and scanners which are not pertinent to the present inventions, such as the printing system, image processing system and interaction with a host computer, have been omitted for the sake of simplicity.

Figure 1:
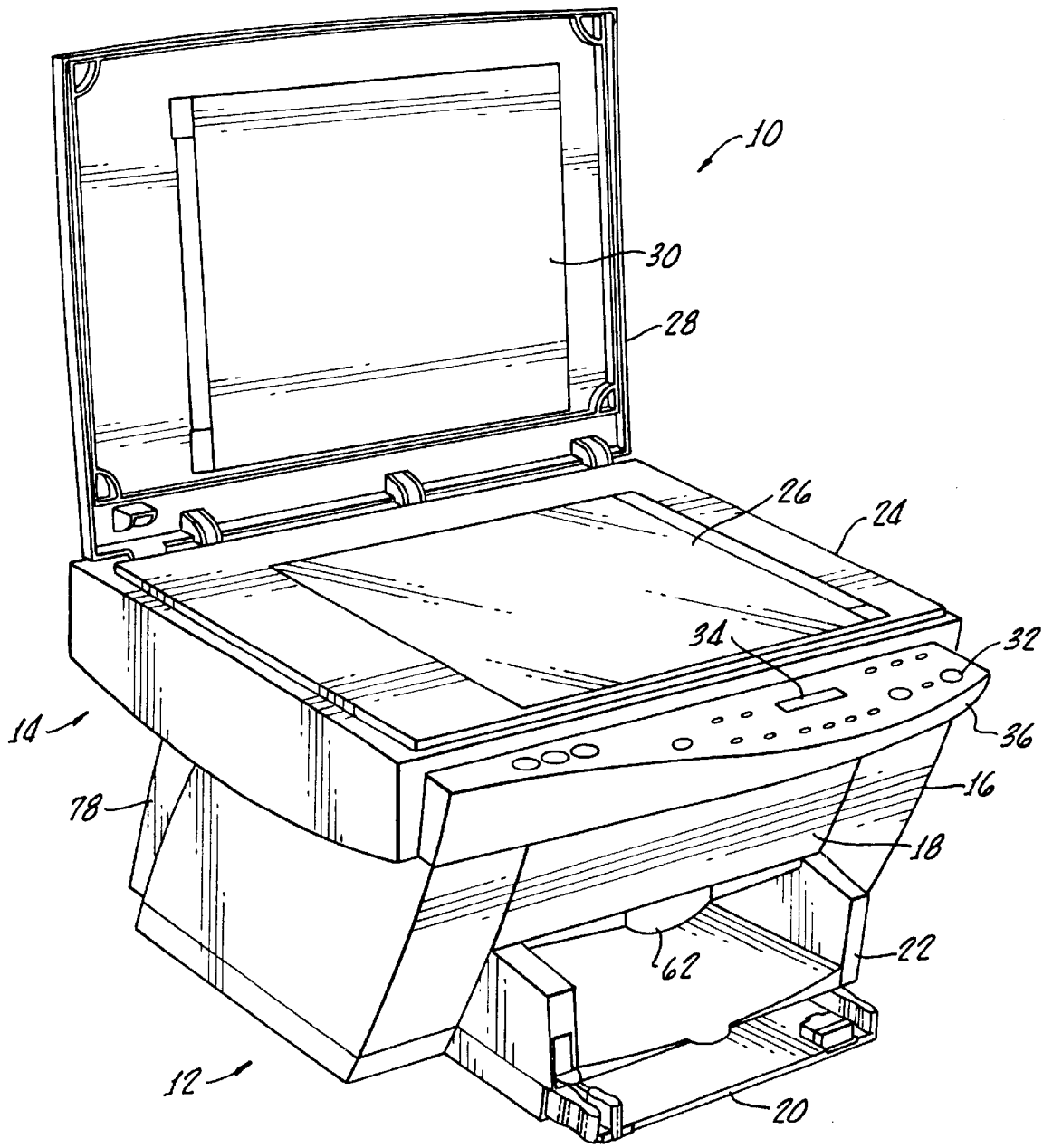
FIG. 1 is a perspective view of an apparatus for producing hardcopy documents in accordance with a preferred embodiment of a present invention with the scanner cover opened and the scanner pivoted downwardly.

As illustrated for example in FIG. 1, an apparatus 10 for producing hardcopy documents in accordance with a preferred embodiment of a present invention includes a printer 12 and a scanner 14. The printer 12 includes a printer housing 16 having a door 18 which provides access to the interior of the printer housing. Such access allows users to clear printer jams and, in those instances where the printer 12 is an ink jet printer (such as in the illustrated embodiment), to remove and install printer cartridges. The printer 12 also includes an input tray 20 for storing paper or other image bearing substrates and output tray 22 for storing finished products. The scanner 14 includes a scanner housing 24 with a glass scanning window 26 on which an object may be placed for scanning. A scanner cover 28, which is provided with a resilient pad 30, is pivotably connected to the scanner housing 24. The apparatus 10 also includes a plurality of control buttons 32 and a display 34. In the preferred embodiment illustrated in FIG. 1, the control buttons 32 and display 34 are disposed in a control panel 36 on the scanner housing 24.

With respect to the internal components of the printer 12 and scanner 14, suitable printing land scanning systems include those found in conventional printers and scanners and, preferably, those employed in the Hewlett-Packard OfficeJet™ Pro 1170 desktop color printer/scanner/copier.

Figure 2:
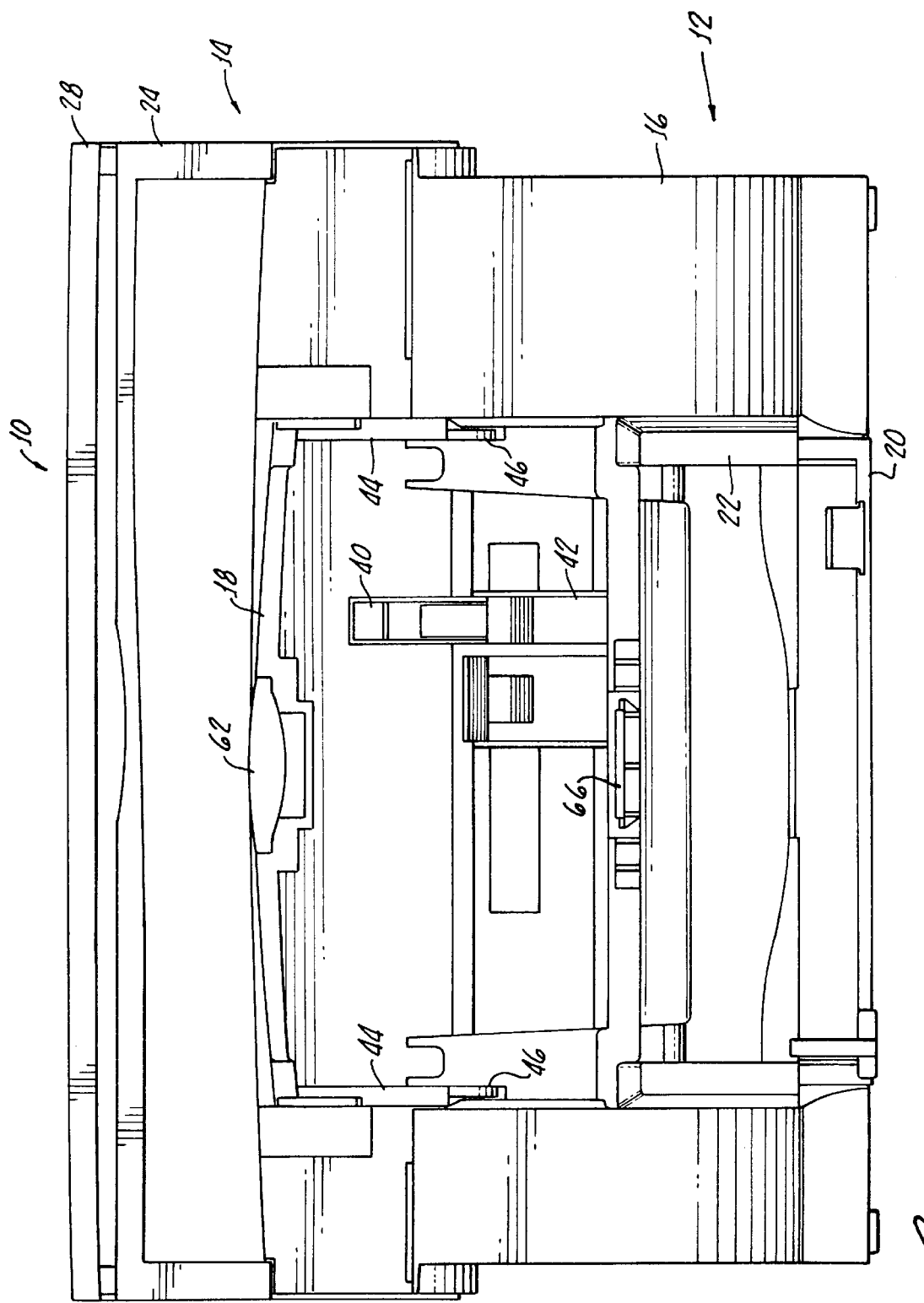
FIG. 2 is front view of the apparatus for producing hardcopy documents illustrated in FIG. 1 with the scanner cover closed and the scanner pivoted upwardly.
Figure 3:
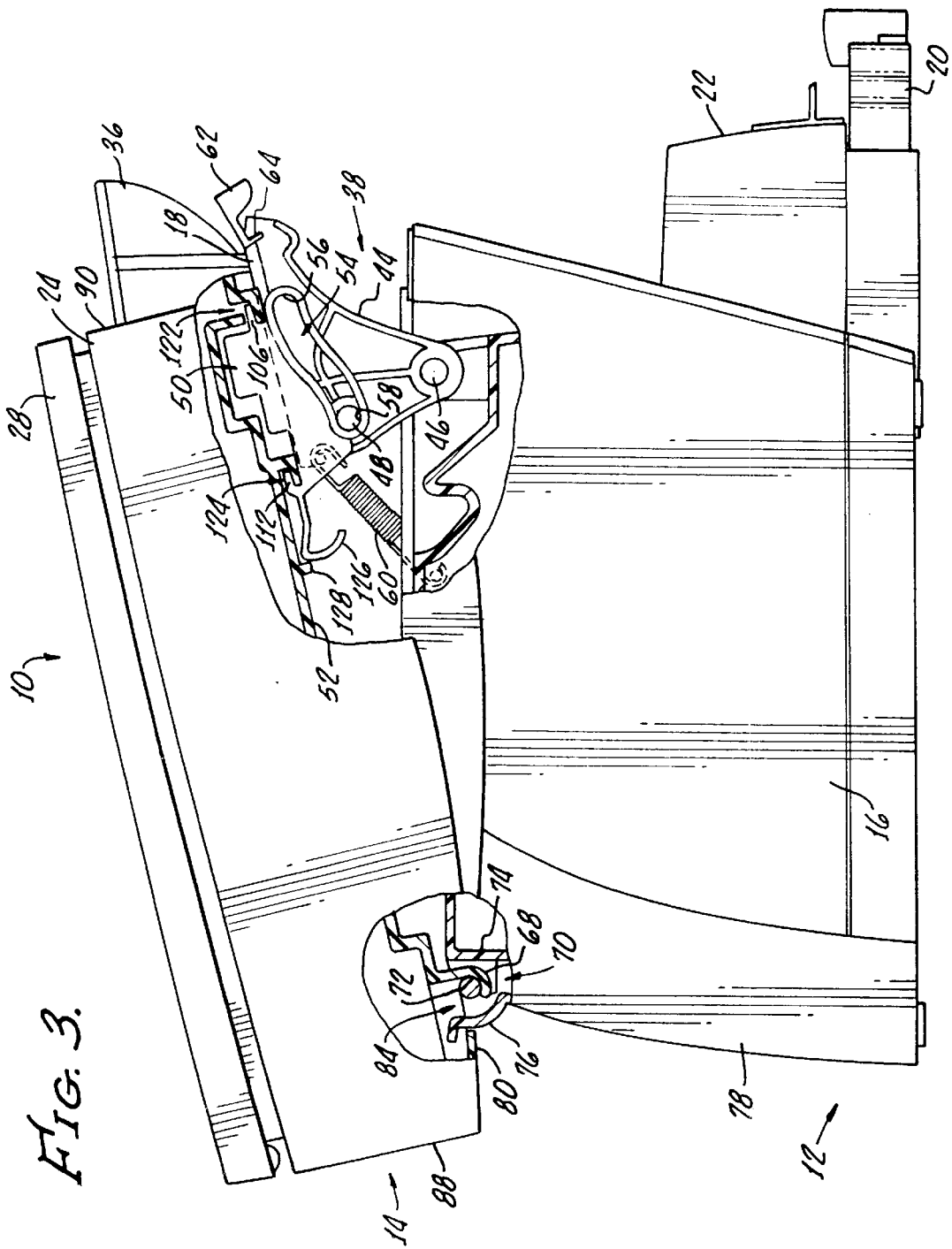
FIG. 3 is a side, cutaway, partial section view of the apparatus for producing hardcopy documents illustrated in FIG. 1 with the scanner cover closed and the scanner pivoted upwardly.

As shown by way of example in FIGS. 2 and 3, the scanner 14 is pivotable relative to the scanner 14 and, in the illustrated embodiment, the scanner will pivot upwardly when the printer housing door 18 is opened and pivot downwardly when the door is closed. More specifically, the exemplary apparatus 10 is provided with a mechanism 38 that links the printer housing door 18 to the scanner 14. When the printer housing door 18 moves from the closed position illustrated in FIG. 1 to the opened position illustrated in FIGS. 2 and 3, the scanner 14 will pivot upwardly from the position illustrated in FIG. 1 to that illustrated in FIGS. 2 and 3. The extra clearance provided by the pivoting of the scanner 14 allows the locking lever 40 on the printer cartridge 42 (such as a pen cartridge) to be pivoted upwardly to the unlocked position illustrated in FIG. 3 so that the cartridge can be removed or installed. Absent the pivoting of the scanner 14, the height of the printer housing 16 would have to be increased to allow for cartridge removal and installation. As such, the present invention results in a compact apparatus.

Figure 4:
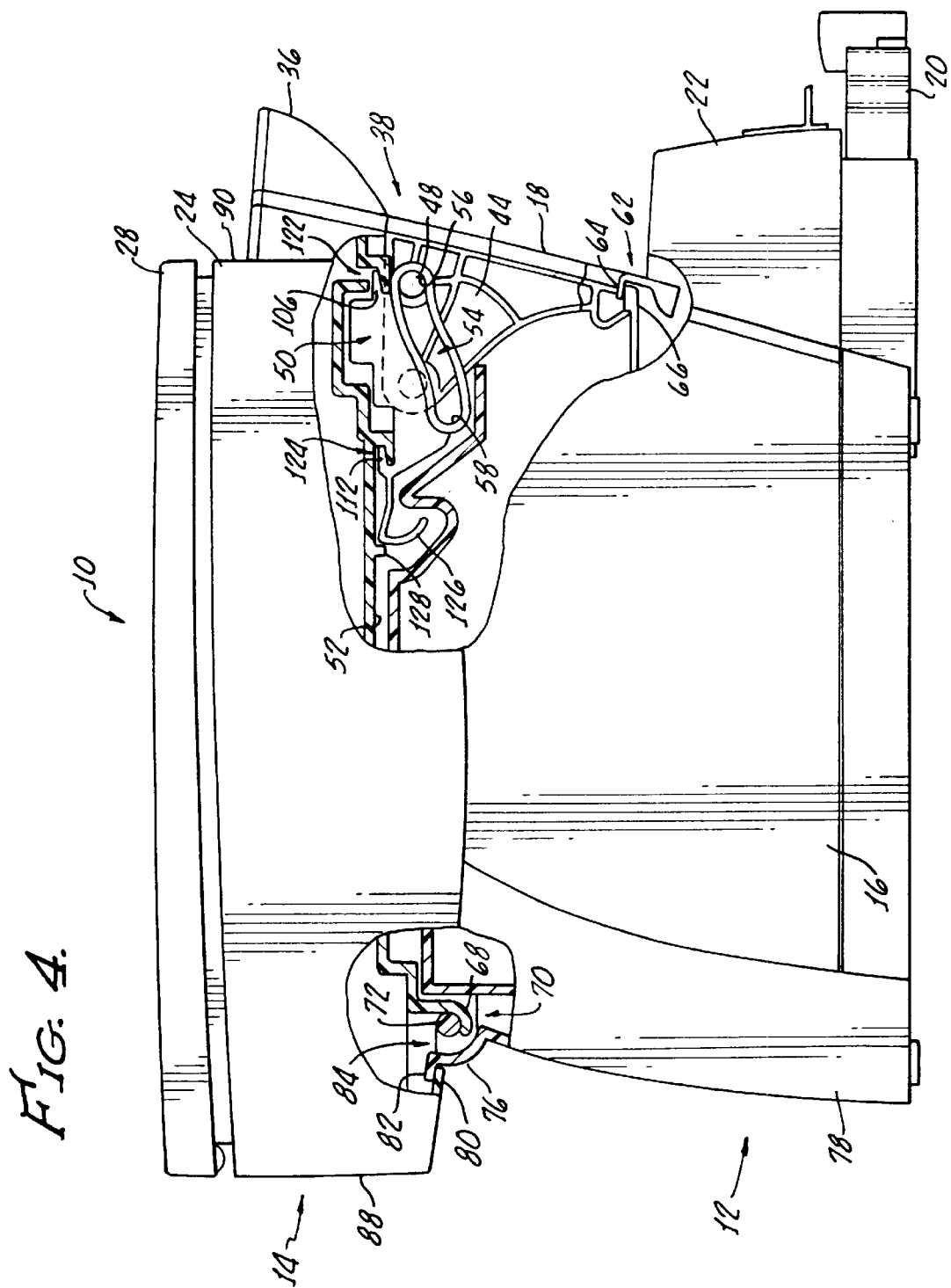
FIG. 4 is a side, cutaway, partial section view of the apparatus for producing hardcopy documents illustrated in FIG. 1 with the scanner cover closed and the scanner pivoted downwardly.

Although other mechanisms may be employed, the exemplary mechanism 38 is a slot and pin mechanism that is best seen in FIGS. 3 and 4. The printer housing door 18 is supported by a pair of side arms 44 that are pivotably secured to the printer housing 16 by hinges 46. Each of the side arms 44 has a pin 48 mounted thereon. A pair of slot members 50 extend downwardly from the bottom surface 52 of the scanner housing 24. Each slot member 50 has a slot 54 formed therein. The side arms 44 and slot members 50 are respectively arranged such that the pins 48 will ride in the slots 54. The pins 48 move upwardly and rearwardly when the printer housing door 18 is opened. As the pins 48 move upwardly and rearwardly, the scanner 14 is pivoted upwardly and the pins move from the front end 56 of the slots 54 to the rear end 58. The reverse occurs as the printer housing door 18 is closed.

The printer housing door 18 is held open and the scanner 14 maintained in the upwardly pivoted position by virtue of the relative positions of the side arms 44, hinges 46 and pins 48 when the housing door 18 is open. As shown by way of example in FIG. 3, the side arms 44 pivot over center and, once the printer housing door 18 reaches its fully opened position, the pins 48 are located rearwardly of the hinges 46. Thus, the preferred embodiment eliminates the need for relatively strong springs to hold the scanner up. The relative locations of the hinges 46 and pins 48 also prevent the scanner 14 from being slammed down onto the printer 12 should the user inadvertently lean on the scanner or otherwise apply a downward force thereto when the printer housing door 18 is opened and the scanner is pivoted upwardly.

In the preferred embodiment, a tension spring 60 is secured to each of the side arms 44 and to the printer housing 16, thereby biasing the printer housing door 18 towards the open position. Given the weight of the scanner 14, the tension spring 60 is beneficial in that it makes the printer housing door 18 easier to open and prevents the scanner from slamming down onto the printer 12 when the door is being closed. The printer housing door 18 includes a locking device 62 that prevents the tension spring 60 from pulling the housing door 18 open until desired by the user. The locking device has a tab 64 which mates with a corresponding tab 66 on the printer housing 16.

The force exerted on the side arms 44 by the tension spring 60 is non-linear. In order to insure that the force required to open the printer housing door 18 will be uniform over the entire range of door movement, the slots 54 in the illustrated embodiment are curved and, more specifically, are substantially S-shaped, as illustrated for example in FIGS. 3 and 4. The curvature of the slots 54 varies the angle of the surface that the pins 48 apply force to as the printer housing door 18 moves upwardly, thereby balancing out the non-linear aspects of the spring force.

As noted above, the scanner 14 pivots relative to the printer 12. In the illustrated embodiment, the scanner 14 and printer 12 are pivotably connected to one another by way of a pair of curved hinge members 68 that extend from the bottom surface 52 of the scanner housing into respective slot 70 and hinge rod 72 arrangements. [FIGS. 3–5.] The curved hinge members 68 are substantially J-shaped with the bottom portions thereof extending around the bottom surface of the hinge rods 72. The shape of the hinge members 68, and the limited space between the slot walls 74 and the hinge rods 72 combine to prevent the scanner 14 from being separated from the printer 12 when the scanner is in the positions illustrated in FIGS. 3 and 4. The scanner 14 can only be removed from the printer 12 when the scanner has been rotated to the substantially vertical orientation illustrated in FIG. 5.

Figure 5:
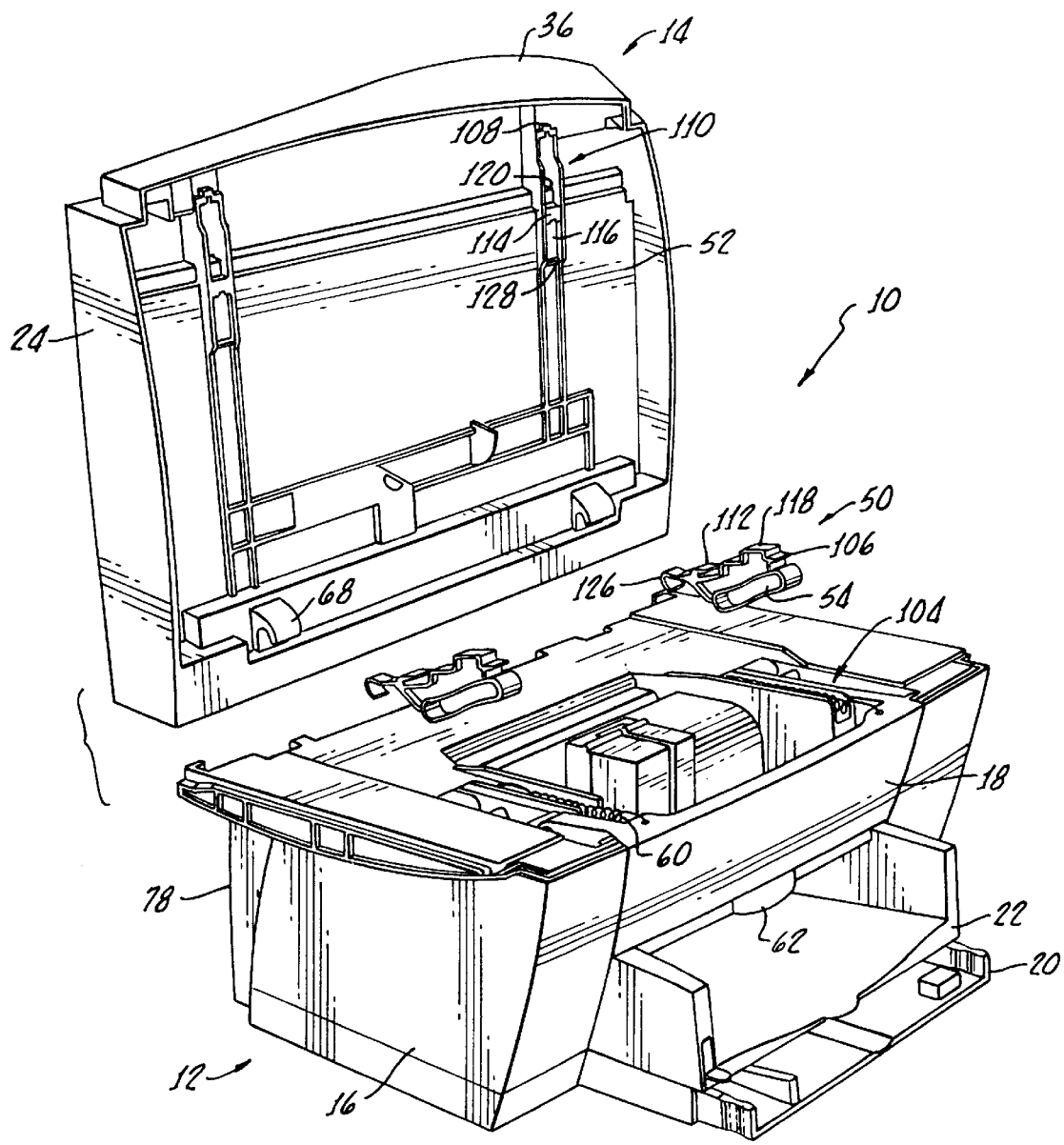
FIG. 5 is an exploded view of the apparatus for producing hardcopy documents illustrated in FIG. 1.
Figure 6:
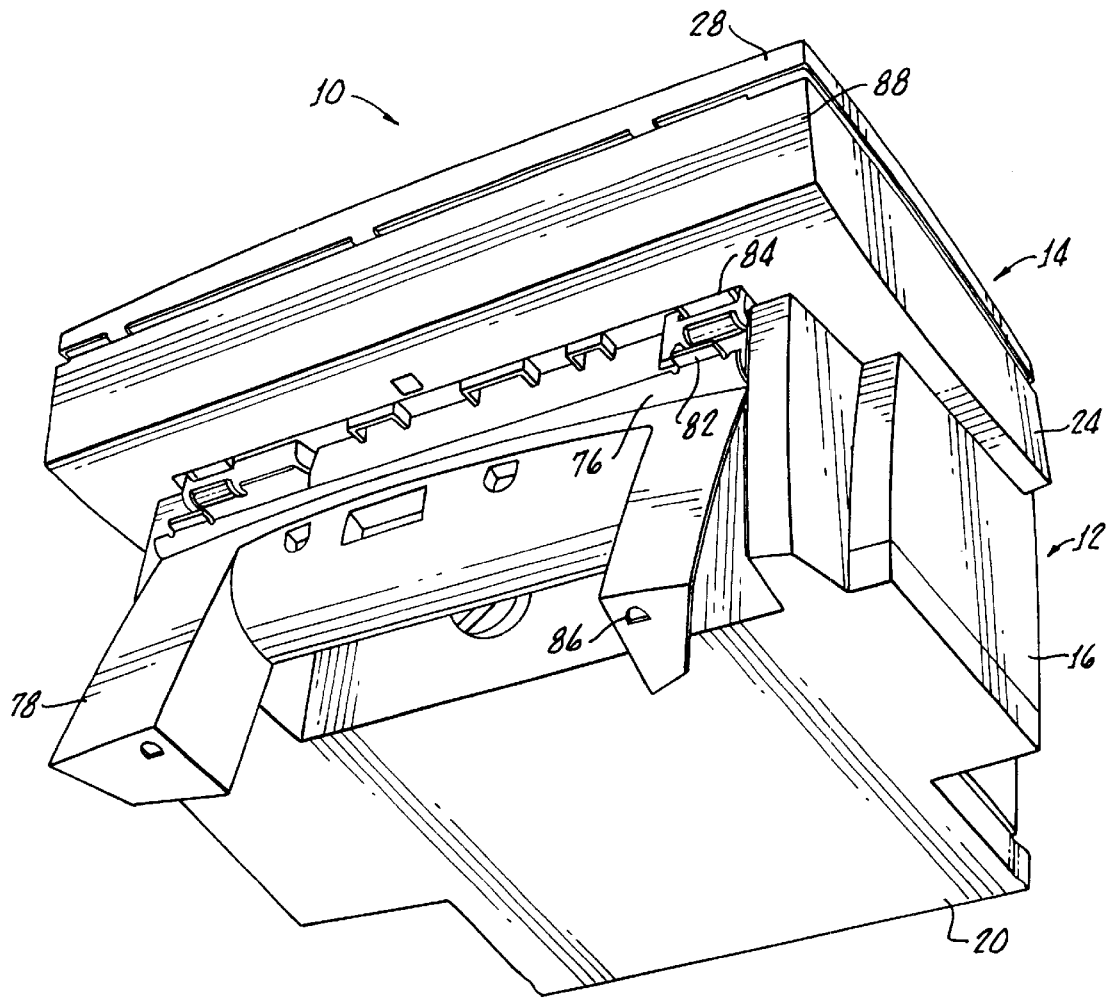
FIG. 6 is a rear perspective view of the apparatus for producing hardcopy documents illustrated in FIG. 1 with the back panel partially removed.

A locking device is provided to prevent unintended separation of the printer 12 and scanner 14. In the preferred embodiment, the locking device prevents the scanner from being rotated beyond the angular position illustrated in FIG. 3, where it can not be removed, to the angular position illustrated in FIG. 5, where it can be removed. Referring more specifically to FIGS. 3, 4 and 6, the locking device in the preferred embodiment may be a curved outwardly extending portion 76 of the printer housing back panel 78. The outwardly extending portion 76 allows the scanner 14 to pivot from the position illustrated in FIG. 4 to that illustrated in FIG. 3. When the scanner 14 reaches the position illustrated in FIG. 3, a surface 80 on the scanner housing 24 will engage the outwardly extending portion 76, thereby preventing the scanner from pivoting any further. In the illustrated embodiment, the printer housing back panel 78 is provided with tabs 80 that may be placed into slots 82 in the scanner housing 24 when the back panel is oriented in the manner illustrated in FIG. 6. The lower portion of the printer housing back panel 78 may then be rotated toward the printer housing 16 and snap-locked into place with resilient members (not shown) on the printer housing that engage a pair of apertures 84 in the lower portion of the back panel.

In accordance with another aspect of the preferred embodiment, the hinge members 68 are positioned in spaced relation to the rearward end 88 of the scanner housing 24. The amount of force required to lift the scanner 14 is, of course, less than that which would be required if the hinge members 68 (or other type of hinges) were located at the rearward end 88 as in a conventional clam shell arrangement. In one implementation, the length of the scanner housing 24 is approximately 13 inches measured from the forward end 90 to the rearward end 88, and the hinge members 68 are approximately 2 inches from the rearward end. The hinge members 68 are preferably at least 15% of the total length from the rearward end 88.

Figure 7:
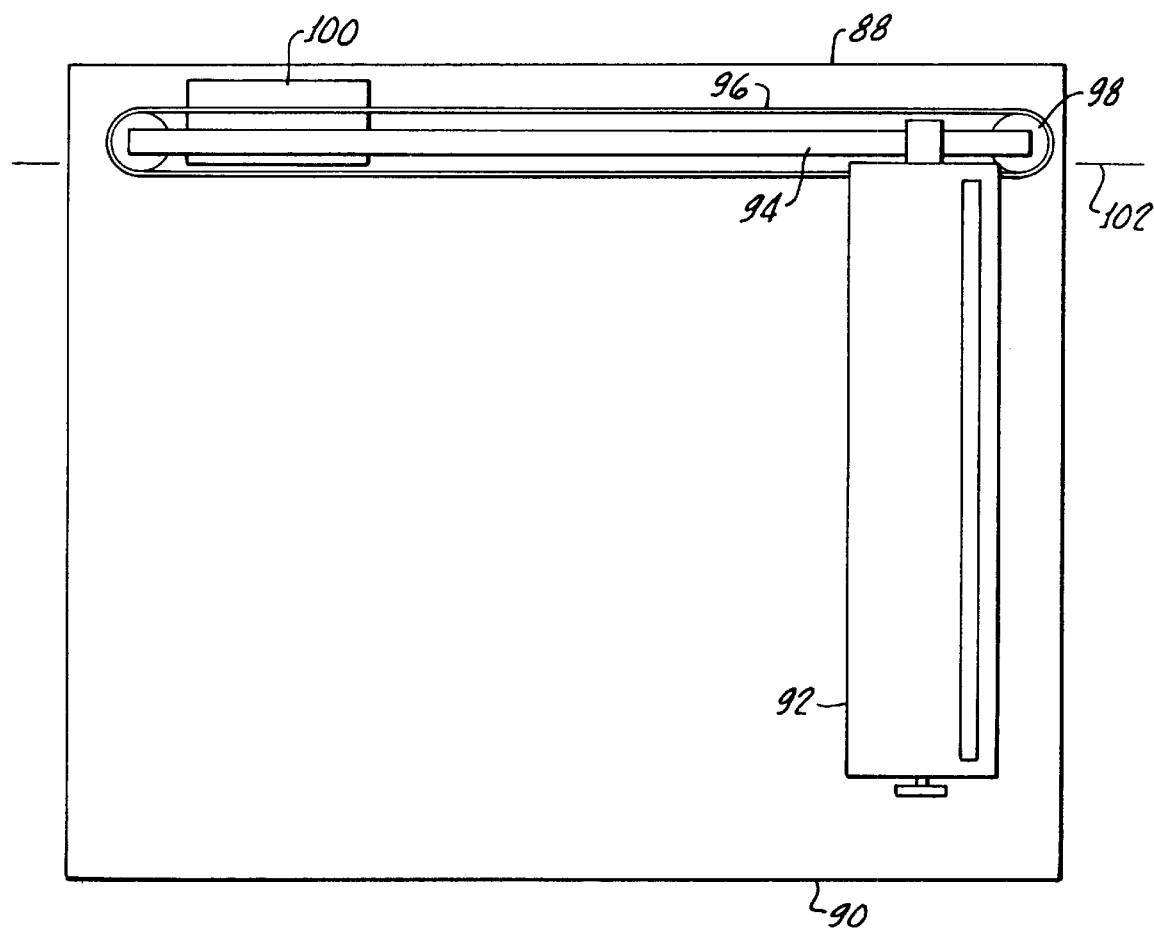
FIG. 7 is a plan view of some of the internal components of an exemplary scanner that may form part of an apparatus for producing hardcopy documents in accordance with a present invention.

The amount of force required to lift the scanner 14 may be further reduced by moving various components of the scanner closer to the rearward end 88, thereby moving the center of gravity towards the rearward end and is preferably closer to the rearward end than to the forward end 90. As illustrated for example in FIG. 7, the scanner 14 includes, as do many conventional scanners, a scanner module 92 having an image detector, a guide rod 94, a belt 96 and pulley 98 arrangement that drives the scanner along the guide rod, and a motor 100 which is connected to one of the pulleys by gears (not shown). Here, however, the guide rod 94 is located approximately along the pivot axis 102 and the motor 100 located rearwardly of the pivot axis, thereby moving the center of gravity toward the rearward end 88. In addition, internal components of the scanner module 92, such as the lamp drive, may also be located close to the pivot axis 102.

Assembly of the printer 12 and scanner 14 in the exemplary apparatus 10 may be accomplished in the following manner. Referring to FIG. 5, the printer housing door 18 is initially placed in the open position. The slot members 50 are placed adjacent the printer housing door 18 such that the pins 48 are within the slots 54. The door 18 is then closed and the slot members 50 are placed in channels 104 in the top surface of the printer housing 16. Next, the scanner 14 is oriented in the manner illustrated in FIG. 5, the hinge members 68 are placed in the slots 70, the scanner 14 is pivoted downwardly onto the printer 12 and the rear panel 78 is put into place to prevent scanner from being separated from the printer.

At this point, the top surface of a forward tab 106 on each slot member 50 will rest against a forward surface 108 adjacent a forward channel 110 in the scanner housing bottom surface 52, and the top surface of a rearward tab 112 will rest against a rearward surface 114 adjacent a rearward channel 116. The printer housing door 18 is then opened, which causes each slot member 50 to move rearwardly until a top projection 118 engages a wall 120 in the channel 110. At this point, the forward tab 106 will advance beyond the surface 108 and fall into the forward channel 110 and the rearward tab 112 will advance beyond the rearward surface 114 and fall into the rearward channel 116.

The next step in the assembly process is to close the printer housing door 18, which causes each slot member 50 to move forwardly and lock into the scanner housing 24 in the manner illustrated for example in FIGS. 3 and 4. Specifically, when a slot member 50 moves forwardly, the forward tab 106 will slide into a forward aperture 122 and the rearward tab 112 will slide into a rearward aperture 124. At the same time, a resilient locking member 126 will be interference fit against a rear wall 128 in the rearward channel 116, thereby locking the slot member 50 into the scanner housing 24. At this point, the scanner 14 is secured to the rearward end of the printer 14 by way of the curved hinge members 68, slots 70, and hinge rods 72 interconnections and is secured to the forward end of the printer by way of the slot members 50, pins 48, and printer housing door 18 interconnections.

Finally, ribbon cables (not shown) from, the control panel 36, scanner module 92 and motor 100, which extend outwardly from the rear of the scanner housing 24, are connected to I/O ports in a system control module (not shown) located in the printer housing 16. The system control module also includes suitable I/O ports for connections to computers and telephone lines and a power input port.

To disassemble the illustrated embodiment, the cables must first be disconnected and the back panel 78 removed. The next steps are to open the printer housing door 18, thereby providing access to the resilient locking members 126, and manually force the resilient locking members out of the rearward channels 116. The slot members 50 will then fall off of the scanner housing 24 and away from the pins 48. The scanner can then be pivoted to the position illustrated in FIG. 5 and pulled away from the printer.

Although the present inventions have been described in terms of the preferred embodiment above, numerous modifications and/or additions to the above-described preferred embodiment would be readily apparent to one skilled in the art. It is intended that the scope of the present inventions extend to all such modifications and/or additions.

I claim:

1. An apparatus for producing hardcopy documents, comprising:
    a printer including a printer housing;
    a scanner, pivotably connected to the printer, including a scanner housing; and
    a door, movable between an open position and a closed position, and associated with the printer and scanner such that the scanner will pivot relative to the printer in response to movement of the door.

2. An apparatus for producing hardcopy documents as claimed in claim 1, wherein the printer housing is pivotably connected to the scanner housing.

3. An apparatus for producing hardcopy documents as claimed in claim 1, wherein the door is pivotably connected to the printer.

4. An apparatus for producing hardcopy documents as claimed in claim 1, wherein the printer and scanner define respective forward and rearward ends, the scanner is pivotably connected to the printer at least substantially adjacent the rearward end of the printer, and the door is substantially adjacent the forward ends of the scanner and printer, the printing and scanning apparatus further comprising:
    a mechanical linkage associated with the door and the scanner.

5. An apparatus for producing hardcopy documents as claimed in claim 4, wherein the mechanical linkage comprises a pin and slot arrangement.

6. An apparatus for producing hardcopy documents as claimed in claim 5, wherein door defines longitudinal ends and the pin and slot arrangement comprises first and second pins on respective longitudinal ends of the door and first and second curved slots secured to the scanner along which the first and second pins respectively slide.

7. An apparatus for producing hardcopy documents as claimed in claim 6, wherein the first and second curved slots are substantially S-shaped.

8. An apparatus for producing hardcopy documents as claimed in claim 1, wherein the printer and scanner define respective forward and rearward sends, and a portion of the scanner located in spaced relation to the rearward end of the scanner is pivotably connected to the printer substantially adjacent the rearward end of the printer.

9. An apparatus for producing hardcopy documents as claimed in claim 1, wherein the door is biased toward the open position.

10. An apparatus for producing hardcopy documents, comprising:
    a printer including a printer housing and defining a forward end and a rearward end; and
    a scanner including a scanner housing and defining a forward end and a rearward end, and a portion of the scanner located in spaced relation to the rearward end of the scanner being pivotably connected to the printer substantially adjacent the rearward end of the printer.

11. An apparatus for producing hardcopy documents as claimed in claim 10, wherein the scanner defines a center of gravity and the center of gravity of the scanner is closer to the rearward end of the scanner than the forward end of the scanner.

12. An apparatus for producing hardcopy documents as claimed in claim 10, wherein the scanner includes an image detector and a motor associated with the image detector and the motor is located rearward of the portion of the scanner pivotably connected to the printer.

13. An apparatus for producing hardcopy documents as claimed in claim 10, wherein the scanner includes an image detector and a rod on which the image detector rides and the rod is located substantially adjacent to the portion of the scanner pivotably connected to the printer.

14. An apparatus for producing hardcopy documents as claimed in claim 10, wherein the scanner defines a predetermined distance from the forward end to the rearward end and the portion of the scanner pivotably connected to the printer is located at least 15% of the predetermined distance from the rearward end.

15. An apparatus for producing hardcopy documents as claimed in claim 10, wherein the scanner housing is pivotably connected to the printer housing.

16. An apparatus for producing hardcopy documents as claimed in claim 10, further comprising:
   a door, movable between an open position and a closed position, and associated with the printer and scanner such that the scanner will pivot relative to the printer in response to movement of the door.

17. A modular apparatus for producing hardcopy documents, comprising:
   a printer including a printer housing;
   a scanner including a scanner housing, the scanner being pivotably connected to the printer; and
   a locking device for releasably coupling the scanner to the printer;
   wherein the printer housing includes slot and hinge rod arrangement and the scanner housing includes curved hinge member.

18. A modular apparatus for producing hardcopy documents as claimed in claim 17, wherein the slot and hinge rod arrangement and the curved hinge member are respectively constructed and arranged such that the curved hinge member can only be inserted into the slot and removed therefrom if the curved hinge member is positioned at a predetermined angle relative to the slot.

19. A modular apparatus for producing hardcopy documents, comprising:
   a printer including a printer housing;
   a scanner including a scanner housing, the scanner being pivotably connected to the printer; and
   a locking device for releasably coupling the scanner to the printer;
   wherein the printer housing includes a removable back panel and the locking device comprises a portion of the housing back panel.

* * * * *